Dec. 5, 1933.  R. G. FEAR  1,937,688
FOCUSING DEVICE FOR CAMERAS
Filed Dec. 23, 1929  2 Sheets-Sheet 1
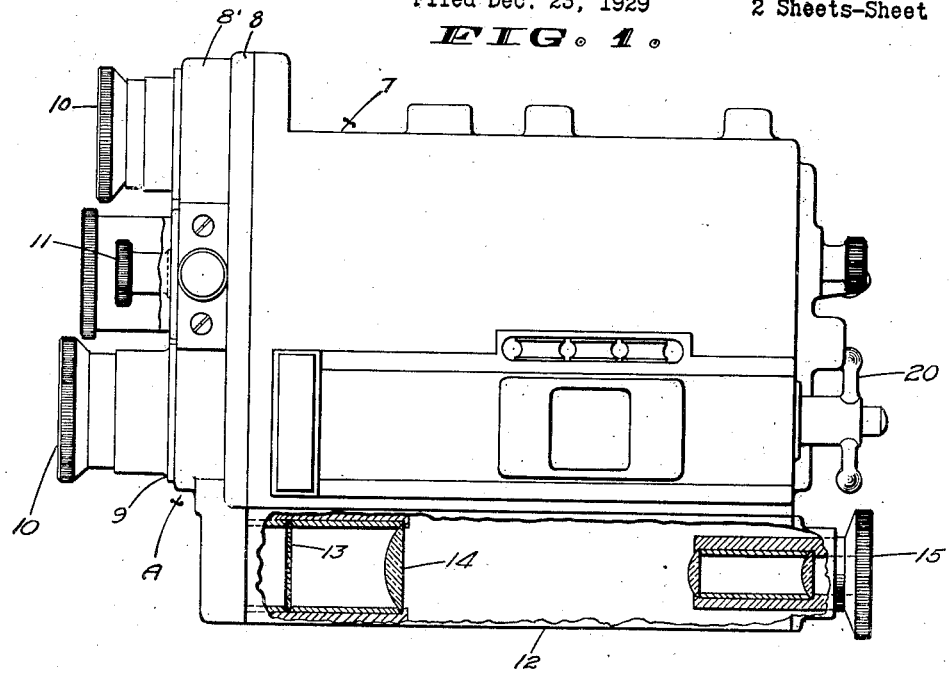
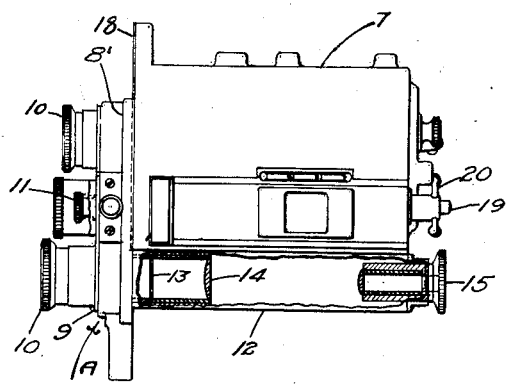 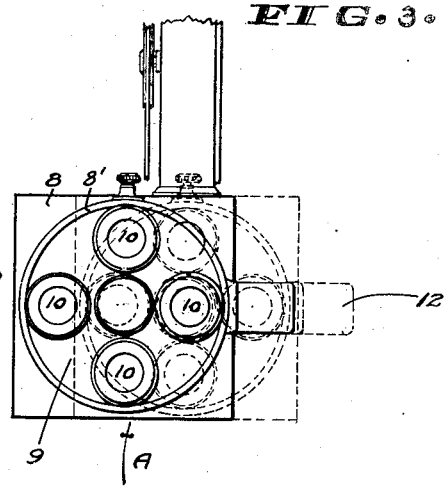
INVENTOR.
RALPH G. FEAR
BY
ATTORNEY.

Dec. 5, 1933.   R. G. FEAR   1,937,688
FOCUSING DEVICE FOR CAMERAS
Filed Dec. 23, 1929   2 Sheets-Sheet 2

INVENTOR.
RALPH G. FEAR
BY
ATTORNEY.

Patented Dec. 5, 1933

1,937,688

UNITED STATES PATENT OFFICE 1,937,688

FOCUSING DEVICE FOR CAMERAS

Ralph G. Fear, Los Angeles, Calif.

Application December 23, 1929
Serial No. 415,973

11 Claims. (Cl. 95—45)

This invention has to do with focusing devices for cameras and the like, a general object of my invention being to provide a highly effective but comparatively simple focusing device by means of which a camera, and particularly a motion picture camera, may be quickly and accurately arranged so that the lens may be adjusted to the required focus. While the invention is applicable to cameras other than motion picture cameras, it is particularly useful on a camera that is used to photograph pictures which may be subsequently greatly enlarged by projecting upon a screen. This type of camera requires very accurate focusing.

The generally accepted principle of operation in motion picture camera work is to set the camera by means of a finder disposed along one side thereof and in substantially horizontal alignment with the photographic lens. One method in common use has this finder arranged on the side of the camera opposite that from which the photo is made. This type of camera has a turret in front which may be rotated so that the photographic lens is brought into position in front of a ground glass in the finder tube. The camera box is then shifted so that the lens occupies the same relative position as it does before the turret was rotated. This method is very awkward, and considerable time is consumed before the lens is properly focused, and after focusing, time is again consumed in rotating the turret to a position in front of the photographic aperture, and then again shifting the camera case so that the lens returns to the same position it was when focused.

Another type of camera has the focusing tube on the door beside the photographic aperture. This camera is built in two sections, a base, the front of which has the lens mounted thereon, and a separate camera box arranged to slide on said base. For focusing, the camera box is shifted sideways until a ground glass member in the focusing tube is brought directly behind the photographic lens. This second type of camera is more practical than the first, but it is difficult to operate because the camera box, magazines, and film, together with such accessories as may be attached to the box, have to be moved therewith. The total weight moved for focusing may thus exceed forty or more pounds.

A third type of camera which was designed primarily for hunting and exploring expeditions has two matched lenses mounted on the camera front and interconnected by gears. One of said lenses is in front of the photographic aperture and the other is in front of a ground glass in the focusing tube. When the focusing tube lens is focused on the ground glass, which is the same photographic plane as the sensitive surface of the film, the photographic lens is automatically focused at the same time. Due to the interconnection between the finder lens and the photographic lens, it is impossible to change the photographic lens, without also changing the focusing tube lens, and with this camera a large number of lenses are required to be carried in separate containers, no provision being made for carrying more than one photographic lens and one focusing lens on the camera itself. Due to this fact, the camera is more or less limited in its use.

European cameras commonly focus directly on the film, the image being viewed either by looking directly through a focusing tube at the image on the film or through a finder on the side of the camera box which is arranged so that the image is reflected through a plurality of mirrors or prisms into the focusing tube. This latter method is dangerous for the sensitized film may be fogged by any light that may enter the camera by way of the focusing tube.

Having briefly described some of the most common means of focusing motion picture cameras and their defects, I will now describe the focusing device I have invented.

My invention relates to a focusing device or tube which is permanently affixed to the side of a camera box, and means for mechanically moving the photographic lens into a position in front of the focusing tube so that its image may be visually observed during the process of focusing.

Another object of my invention is to provide means whereby several lenses may be affixed to the front of the camera and each, or any one, of these lenses may be brought into proper position for focusing or photographing on the sensitive film surface in the camera.

It is a further object of my invention to provide a device of the above character which is simple in construction and easily operated. Other objects will appear in the following description.

I attain these objects by the method and apparatus illustrated in the accompanying drawing, in which Fig. 1 is a view in plan illustrating the camera and particularly showing how the focusing tube is mounted thereon;

Fig. 2 is another view in plan showing the lens carrier shifted to bring the lens used for photographing into registration with the focusing tube. This view also shows a plurality of lenses mounted on a rotatable turret in front of the camera, with one of the lens mountings partly broken away;

Fig. 3 is a front elevation of a camera showing the lens in photographing position in full lines, and in focusing position in dotted lines;

Similar numerals refer to like parts in each of the several views.

Figure 4:
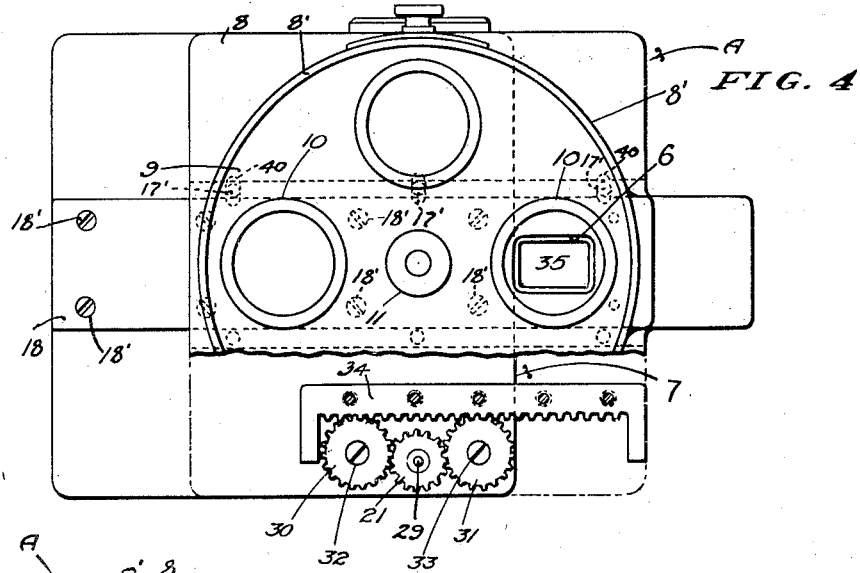
Fig. 4 is a front elevation of the camera with part of the lens carrier and turret broken away to more particularly disclose the rack and pinions used to move the lens carrier.

The reference numeral 7 indicates a camera case upon which is mounted a lens carrier A, said camera case being provided with a photographing aperture 6. The carrier A includes a plate 8 slidably mounted upon the camera case 7, which plate is provided with an upstanding circular flange 8' that is adapted to receive a lens turret 9, upon which are mounted a series of photographic lenses 10 adaptable to motion picture photographing. The lens turret 9 is journaled in the upstanding flange 8', and is adapted to be rotated so that any one of the lenses mounted thereon may be indexed to the proper position in front of the photographic aperture 6. A suitable screw 11 engaging a screw-threaded hole 11' in the plate 8 holds the turret 9 in place.

Mounted at the side of the camera case 7 is a focusing tube 12 which has a ground glass 13, or other suitable translucent material mounted in its forward end at the same focal plane as the sensitive film in the film feeding mechanism of the camera. The tube 12 is provided at its objective end with means for operably receiving one of the photographic lenses 10. An astronomical type telescope, which consists of an objective lens 14 and a slidably adjustable eye piece 15 is used for viewing the image formed on the ground glass.

I do not confine myself to the lens system shown as any suitable magnifying combination may be used. The resultant image may be either erect or inverted, depending upon the optical system used.

Figure 5:
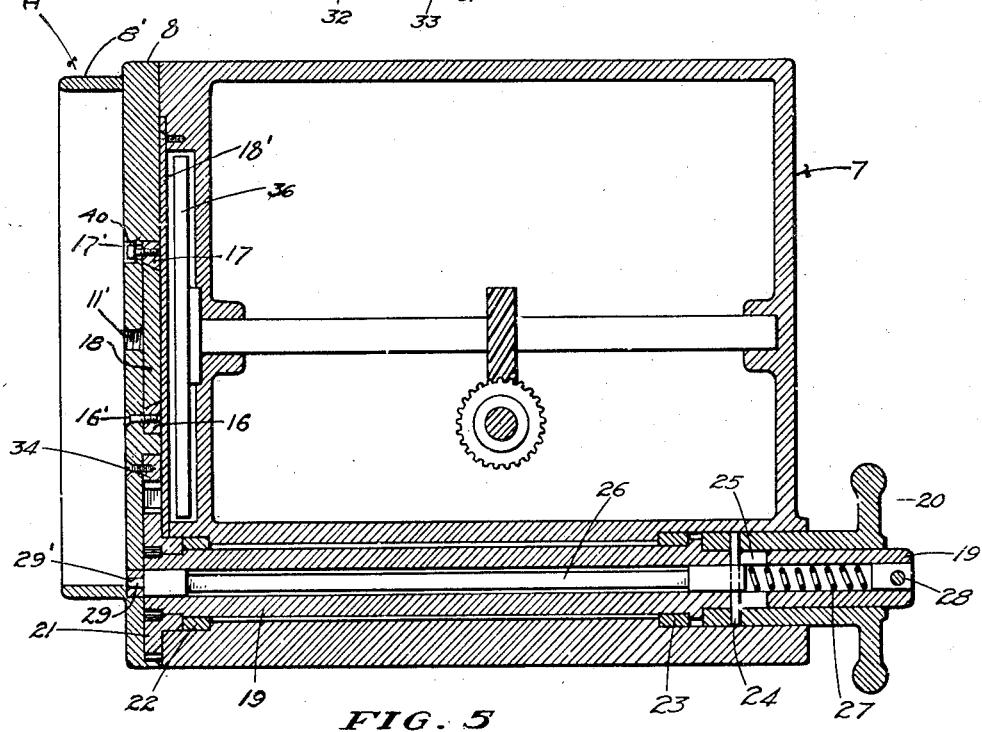
Fig. 5 is a view in elevation and section showing the mechanism by which the lens carrier is shifted to bring the photographic lens into registration with the focusing tube, or photographic aperture as the case may be.

Referring to Fig. 5, the lens carrier A, mounted upon the front of the camera case 7, is provided with guides 16 and 17 mounted upon plate 8 by means of screws 16' and 17', respectively, which form the female section of a conventional dovetail arrangement. The male section 18 of the dovetail arrangement is attached to the camera case 7 by means of screws 18', said male section bearing in the guides 16 and 17. The guide 17 is movably positioned on the plate 8 by means of slots 40 which cooperate with the screws 17' to compensate for any resultant play that may develop in the dovetail arrangement.

A rotatable hollow shaft 19, having a handle 20 slidably affixed upon the rear portion thereof, and a pinion gear 21 mounted upon the forward end thereof, is journaled in the camera case 7 by journals 22 and 23 respectively, preventing any longitudinal movement of said shaft. The handle 20 is affixed to the shaft 19 by a pin 24 arranged to slide in a driving slot 25 formed in the shaft 19. A slidable indexing shaft 26 provided at the forward end with a pin projection 29 is journaled within the said hollow shaft 19 and securely affixed to said handle 20 by the aforesaid pin 24 which also operates as a key to turn said shaft 19. A spring 27 within said shaft 19 is held in position by a block 28 mounted within the end of the shaft 19. Said spring 27 exerts a pressure that normally forces said slidable indexing shaft 26 forward and forces said pin 29 into index holes 29' located in the plate 8, thus locking said lens carrier A into predetermined fixed positions. Means is provided for shifting the lens carrier A transversely to the front of the camera and preferably consists of a pinion gear 21 mounted upon the shaft 19 and meshing with pinions 30 and 31, respectively, which are journaled on the camera case 7 by pins 32 and 33, and which, in turn, mesh with a rack 34 securely affixed to the plate 8 best shown in Fig. 4. Mounted above the camera case 7 is a film mechanism which is adaptable to enclose the raw film upon which a photograph is to be made, said film leads downwardly through the top of the camera case to a film feeding sprocket to which it is held in engagement by rollers, then through a film feeding mechanism where the exposure is made, back to the said feed sprocket to which it is again held in engagement by rollers, and is then drawn back into the film mechanism by a take-up pulley all in the usual manner of operating a conventional camera. Inasmuch as any conventional film feeding mechanism may be used in conjunction with my invention no showing of such a mechanism is included in the drawings.

The film, while intermittently moving through the aforesaid film feeding mechanism, passes by an exposure aperture 35 which coincides with the aperture 6 of the camera case 7 and during the time the film is momentarily arrested, a shutter mechanism 36 being in an open position, the film is exposed to a light admitted through the lens 10 mounted on the lens carrier A and projected through the camera aperture 6, the shutter 36 and the aperture 35.

The particular function of the device and the method of operation is as follows:

The camera is placed upon a tripod or other suitable base. A magazine loaded with film is placed upon the camera and brought into engagement with the film feeding mechanism contained therein. The camera door to which the focusing tube 12 is attached is then closed. The lens carrier shifting handle 20 is then grasped by the hand of the operator, the thumb of whom is pressed upon the plug 28, thereby establishing a convenient point of leverage for pulling out said handle 20 whereby said index shaft 26 is withdrawn and the finger 29 removed from the index hole 29' of the lens carrier A to permit rotation of the handle 20. By rotating the handle 20, the aforesaid pinion 21 rotates pinions 30 and 31 engaging with the aforesaid rack 34, and causes the lens carrier A to move transversely to the front of the camera to the position shown in Fig. 2, whereby a correct alignment of the focus elements herein described results. Suitable stop pins 37 and 38 limit the travel of said lens carrier A so that the lens carrier can be shifted into two positions, with the photographic lens in front of the focus tube 12, as shown in Fig. 2, or with a photographic lens in front of the photographic exposure aperture 35, as shown in Fig. 1. When the photographic lens 10 has been properly focused by visual observation through the focusing telescope, the lens is again shifted back into proper position in front of the photographic aperture and the camera is then ready for photographing as shown in Fig. 1.

While I have omitted, for the sake of simplicity, illustrations showing further adaptations or modifications of my invention, it is to be understood that these are possible. I am also aware that slight modifications may from time to time be made in the details of construction, illustrated herein, without departing, however, from the scope of the present invention as herein set forth and as defined in the claims which are appended hereto. Therefore, I do not limit my present invention to the exact description of construction herein disclosed.

I claim as my invention:

1. A focusing device for cameras including: a camera case; a lens carrier adjustably and slidably mounted on the end portion of said case; and a rotatable lens turret mounted on said lens carrier.

2. A focusing device for cameras including: a case; a lens carrier adjustably and slidably mounted on the end portion of said case; a rotatable lens turret mounted on said carrier; and indexing means for locking said lens turret in fixed positions.

3. In a focusing device, the combination of: a camera having a case with an aperture therein; a focusing tube mounted on said case; a lens carrier slidably mounted on the apertured end of said case, said carrier including a rotatable lens turret; a plurality of lenses mounted on said turret; and means for indexing any one of said lenses in front of the aperture of said camera or in front of said focusing tube.

4. In a focusing device, the combination of: a camera having a case with an aperture therein; a focusing tube affixed to the side of said camera case; a lens carrier adjustably and slidably mounted on the apertured end portion of said case; a rotatable lens turret adapted for mounting a plurality of lenses, mounted on said lens carrier; and means for bringing one of said lenses into focusing position in front of the camera aperture or the focusing tube.

5. In a focusing device, the combination of: a camera having a case with an aperture therein; a lens carrier slidably mounted on the apertured end portion of said case; a lens mounted on said lens carrier and normally aligned with the aperture of said camera case; a focusing device juxtapositioned on said case; mechanical means including a rotatable shaft, pinion gears, spring locking means and a rack engaged by said pinion gears for bringing the lens into registration either with the focusing tube or the aperture of the camera case.

6. In a focusing device, the combination of: a camera case having a photographic aperture therein; a focusing tube associated with said case; a film feed mechanism having a photographic aperture therein; a shutter in front of said photographic aperture; a lens carrier comprising a cover plate slidably mounted on the front end portion of said camera case; a rotatable lens turret mounted on said cover; a plurality of lenses mounted on said turret; means for moving the lens carrier into position either in front of the photographic aperture or the focusing tube, said means including adjustable guide members on said slidable cover plate operatively aligned with guide members on said camera case.

7. In a camera having a case with a photographing aperture therein: the combination of a focusing tube associated with said case; a magazine mounted on said case and adapted for receiving a photographic film; a film feeding mechanism associated with said camera; shutter means associated with said film feeding mechanism; a slidable lens carrier mounted on said case; rack and pinion means engageable with said slidable lens carrier; stop pins limiting the movement of said pinion means whereby said lens carrier is restricted in movable relation to a fixed position either front of the camera aperture or in front of said focusing tube as might be desired.

8. In a focusing device for a camera, the combination of: a camera case, a focusing tube associated with said camera case; photographic film containing and feeding means; associated with said camera case; means including a carrier plate slidably mounted on the front of said camera case for mounting a plurality of focusing lenses on said camera case; means for adjustably positioning individual lenses in focusing relation to said focusing tube; and means whereby said focusing lenses are brought into photographic position for producing an image of a subject to be photographed on the sensitized film in the camera.

9. In combination with a motion picture camera having a case with a photographic aperture therein: and adjustably slidable front cover detachably connected to said case; a rotatable index plate mounted on said cover; a focusing tube mounted on said case; a lens carrier mounted on said index plate; said carrier including a lens turret and a plurality of lenses mounted thereon; means whereby any one of said lenses may be registered with the photographing aperture of said camera and subsequently with said focusing tube; said means including a guide member adaptable for taking up excess play between the aforesaid slidable cover and said camera case; shifting mechanism including an actuating handle shaft whereby said lens carrier may be moved transversely across the front of said camera case so that the image of the article to be photographed may be visually observed during the progress of focusing.

10. In a quick focusing device in combination with a camera: a camera case; a camera film feed mechanism, a photographic aperture in said film feed mechanism, a shutter in front of said aperture, a lens carrier comprising a front cover slidably mounted on the front of said camera case, a rotatable lens turret mounted on said cover, a plurality of lenses mounted on said turret, means for moving the lens carrier into position either in front of the photographic aperture or the focusing aperture; adjustable guide members on said slidable front cover; and a guide member on said camera case operatively aligned with the guide members on said cover for directing the movement of said cover relative to said case.

11. In combination with a motion picture a camera, a case, a slidably adjustable front cover detachably connected to said case, a rotatable index plate mounted on said cover, a quick focusing device, a lens carrier, said carrier including a lens turret, and a plurality of lenses mounted thereon, means whereby said lens carrier may be moved transversely across the front of said camera case and means whereby any of said lenses may be properly registered with the aperture of said camera and said quick focusing device, a guide member adaptable for taking up excess play between aforesaid slidable cover and aforesaid camera case; a film feeding mechanism, a film intermittent mechanism, photographic alignment means, and co-acting handle shaft, spring, gears, rack and shifting mechanism, whereby said camera, and quick focusing device cooperate so that the image of the article to be photographed may be visually observed during the progress of focusing and also whereby each or any of the several lenses therein contained may be brought in photographic relation therewith, substantially as herein described.

RALPH G. FEAR.